United States Patent
Hore et al.

(10) Patent No.: US 8,805,836 B2
(45) Date of Patent: Aug. 12, 2014

(54) FUZZY TAGGING METHOD AND APPARATUS

(75) Inventors: Prodip Hore, San Diego, CA (US); Scott M. Zoldi, San Diego, CA (US); Surjit Singh, San Diego, CA (US)

(73) Assignee: Fair Isaac Corporation, San Jose, CA (US)

( * ) Notice: Subject to any disclaimer, the term of this patent is extended or adjusted under 35 U.S.C. 154(b) by 1155 days.

(21) Appl. No.: 12/201,795

(22) Filed: Aug. 29, 2008

(65) Prior Publication Data

US 2010/0057773 A1    Mar. 4, 2010

(51) Int. Cl.
| | |
|---|---|
| G06F 17/30 | (2006.01) |
| G06N 99/00 | (2010.01) |
| G06K 9/62 | (2006.01) |
| G06Q 30/06 | (2012.01) |

(52) U.S. Cl.
CPC .............. *G06Q 30/06* (2013.01); *G06N 99/005* (2013.01); *G06K 9/6221* (2013.01)
USPC ............................ 707/737; 707/740; 707/780

(58) Field of Classification Search
CPC .......................... G06F 17/16; G06F 17/30265
USPC .......................................... 707/737, 740, 780
See application file for complete search history.

(56) References Cited

U.S. PATENT DOCUMENTS

| | | | |
|---|---|---|---|
| 6,601,048 B1 * | 7/2003 | Gavan et al. | 706/10 |
| 7,089,592 B2 * | 8/2006 | Adjaoute | 726/25 |
| 7,457,401 B2 * | 11/2008 | Lawyer et al. | 379/114.14 |
| 8,065,227 B1 * | 11/2011 | Beckman | 705/39 |
| 8,370,333 B2 * | 2/2013 | Sundaresan et al. | 707/722 |
| 2002/0019790 A1 * | 2/2002 | Edgar et al. | 705/36 |
| 2005/0222929 A1 * | 10/2005 | Steier et al. | 705/35 |
| 2007/0106582 A1 * | 5/2007 | Baker et al. | 705/35 |
| 2008/0101705 A1 * | 5/2008 | Mohamed et al. | 382/224 |
| 2008/0146895 A1 * | 6/2008 | Olson et al. | 600/301 |
| 2009/0119285 A1 * | 5/2009 | Sundaresan et al. | 707/5 |
| 2010/0223265 A1 * | 9/2010 | Fogel | 707/740 |
| 2011/0231439 A1 * | 9/2011 | Sundaresan et al. | 707/769 |

* cited by examiner

*Primary Examiner* — Thanh-Ha Dang
(74) *Attorney, Agent, or Firm* — Mintz Levin Cohn Ferris Glovsky and Popeo, P.C.

(57) ABSTRACT

A computer-implemented method of tagging a transaction that includes tagging a transaction with one of a first tag value or a second tag value, forming a set of clusters associated with the tagged transactions having a first value, and forming a second set of clusters associated with the tagged transactions having a second value. The computer implemented method also includes determining a fuzzy tag value based on a relationship between the transaction and one of the centroids of the clusters having a first tag value, and one of the centroids of the clusters having second value. The method also includes replacing the first tag value or the second tag value with the fuzzy tag value.

22 Claims, 8 Drawing Sheets

FUZZY TAGGING METHOD AND APPARATUS

BACKGROUND

This disclosure relates generally to tagging transactions, and more particularly to methods and an apparatus for fuzzy tagging.

Tags are used to categorize transactions in various models. Making a model includes analysis of historical data to determine variables indicative of fraudulent or non fraudulent transactions. When looking at historical data, the transaction is known to be either fraudulent or non fraudulent. Tags indicate whether the transaction was fraudulent. For example, a tag value of "1" is used to indicate that the transaction is fraudulent and a tag value of "0" in the same filed is used to indicate a non fraudulent transaction. After a model is produced, it is used to predict whether real time or substantially real time transactions are fraudulent or non fraudulent. Generally, when predicting the category of the transaction, the models tend to place questionable transactions in the fraudulent category. In other words, it is safer and more economically judicious to predict a transaction will be fraudulent rather than non fraudulent. Currently, the tags used lack any granularity.

SUMMARY

In general, this document discusses an apparatus or system, and methods for fuzzy tagging. This document discusses a computer-implemented method of tagging a transaction that includes tagging a transaction with one of a first tag value or a second tag value, forming a first cluster associated with the tagged transactions having a first value, and forming a second cluster associated with the tagged transactions having a second value. The computer implemented method also includes determining a first centroid of the first cluster, and determining a second centroid of the second cluster, and determining a fuzzy tag value based on a relationship between the transaction and the first centroid, and the second centroid. The method also includes replacing the first tag value or the second tag value with the fuzzy tag value.

In one embodiment, the relationship for determining the fuzzy tag value includes determining a distance the transaction is from the first centroid, and a distance the transaction is form the second centroid. In some embodiments, the distance between the transaction and the first centroid includes determining the Euclidean distance between the transaction and the first centroid, and wherein determining the distance between the transaction and the second centroid includes determining the Euclidean distance between the transaction and the second centroid. In one embodiment of the method, the first value is set to 0 and corresponds to a non-fraud condition, and the second value is set to 1 and corresponds to a fraud condition. The method may also include determining the fuzzy tag values associated with each transaction by using the formula for computing a fuzzy membership matrix. In one specific embodiment, the fuzzy membership values include a determination of elements of a matrix U $$u_{ij} = \frac{1}{\sum_{k=1}^{C} \left( \frac{\|x_i - c_j\|}{\|x_i - c_k\|} \right)^{\frac{2}{m-1}}}$$

Where, m is any real number greater than 1.

$u_{ij}$ is the degree of membership of $x_i$ (transactions here) in the cluster j, $x_i$ is the $i^{th}$ transaction of d-dimensional measured record, $c_j$ is the d-dimension center of the cluster, and $\|*\|$ is any norm expressing the similarity between any measured transaction and the centroids.

The method may further include forming a plurality of clusters from the tagged transactions having a first value, and forming a plurality of clusters from the tagged transactions having a second value. A centroid for each of the plurality of clusters of the tagged transactions having a first value is determined, and a centroid for each of the plurality of clusters of the tagged transactions having a second value is also determined. Each transaction is associated with a transaction to one of the clusters having a first value and to one of the clusters having a second value. Different transactions may be associated with different clusters. In some instances, the relationship for determining the fuzzy tag value includes determining a weighted average of the distances from a transaction to the plurality of clusters from the tagged transactions having a first value, and determining a weighted average of the distances from a transaction to the plurality of clusters from the tagged transactions having a second value. Once the fuzzy tag value is computed it is substituted in for the initial tag value. In some embodiments, a set of variables associated with the transaction is rated based on the fuzzy tag values of the set of variables. The fuzzy tag values give an indication of the certainty with which one can predict an event.

An apparatus for ranking a set of variables includes a tagging component for tagging a transaction with one of a first tag value or a second tag value, and a cluster forming component for forming a first cluster associated with the tagged transactions having a first value, and forming a second cluster associated with the tagged transactions having a second value. The apparatus also includes a centroid determination component for determining a first centroid of the first cluster and a second centroid of a second cluster, and a fuzzy tag component for determining a fuzzy tag value based on a distance the transaction is from the first centroid, and a distance the transaction is form the second centroid. The apparatus also includes a replacement component for replacing the first tag value or the second tag value with the determined fuzzy tag value. The apparatus may also include an evaluation component for ranking a set of variables associated with the transaction based on the fuzzy tag value associated with a plurality of clusters. Each of the components in the apparatus may include of a combination of hardware and software. In some embodiments, each of the components includes software.

A machine-readable medium that provides instructions that, when executed by a machine, cause the machine to: tag a transaction with one of a first tag value or a second tag value, form a first cluster associated with the tagged transactions having a first value, and form a second cluster associated with the tagged transactions having a second value. The first centroid of the first cluster is determined. The second centroid of the second cluster is also determined. A fuzzy tag value is based on a relationship between the transaction and the first centroid, and the second centroid. The initial values of the first tag or the second tag are replaced with the fuzzy tag value. The first value is 0 which corresponds to a non-fraud condition, and the second value is 1 which corresponds to a fraud condition. In some embodiments, the relationship for determining the fuzzy tag value includes a distance the transaction is from the first centroid, and a distance the transaction is from the second centroid. The fuzzy tag values associated with each transaction are computed using the formula for computing a fuzzy membership matrix. In one embodiment, the machine-readable medium provides instructions that, when executed by a machine, further cause the machine to:

form a plurality of clusters from the tagged transactions having a first value; and form a plurality of clusters from the tagged transactions having a second value. It should also be noted that there may be more than a first cluster and a second cluster that are formed from the various transactions. In some embodiments, there may be a plurality of clusters having a first value and a plurality of clusters having a second value.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
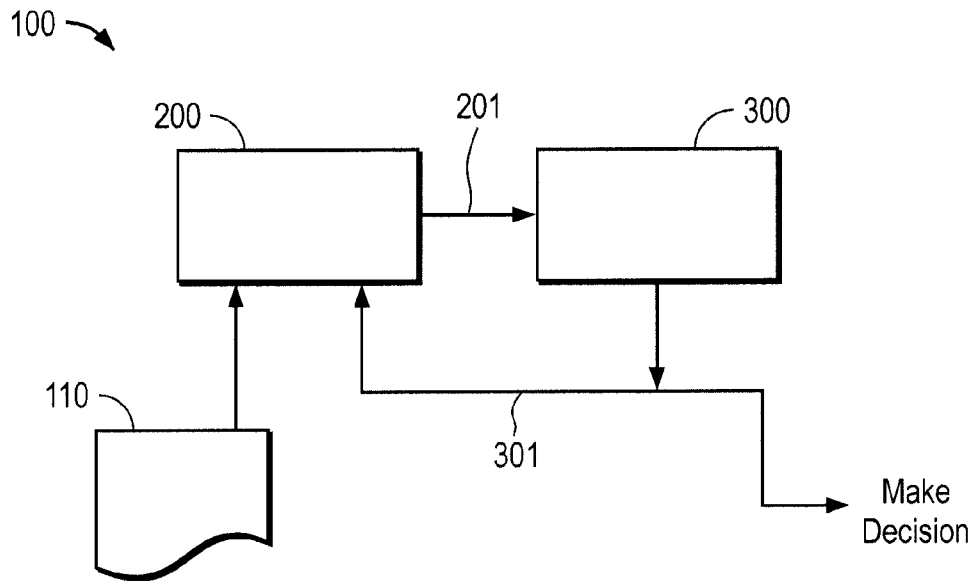
FIG. 1 is a schematic diagram of a fraud detection system, according to an example embodiment.

FIG. 1 is a block diagram of an example fraud detection system 100 that uses at least one embodiment of the invention. As shown in FIG. 1, the fraud detection system 100 includes a learning component 200 and a predictive/scoring component 300. The learning component 200 processes historical data 110 and recognizes various patterns. The learning component has an output 201. The output 201 from the learning component 200 is a model that can be used with live or substantially real time data to predict or detect a fraud. The output 201 of the learning component 200 is input to the predictive/scoring component 300 which categorizes the transaction as fraudulent and scores the likelihood that the transaction is fraudulent. This output 301 can then be used by an institution that can either approve or disapprove a transac-tion. The output 301 can also be fed back into the learning component 200 to be used by the learning component 200 to further refine the model and make the static model dynamic, represented by output 210 of the learning component 200.

Figure 2:
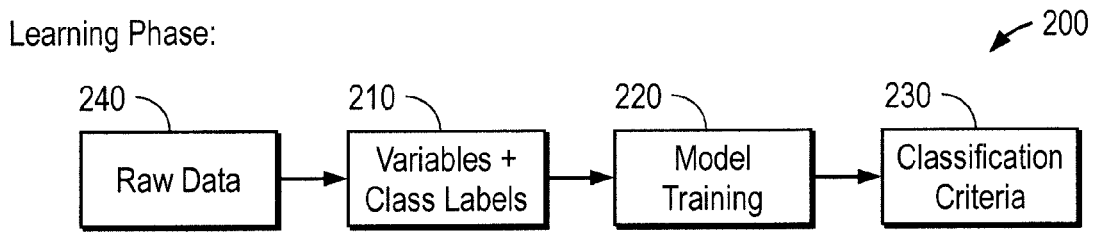
FIG. 2 is a schematic diagram of a learning component of the fraud detection system, according to an example embodiment.

FIG. 2 is a schematic diagram of a learning component 200 of the fraud detection system 100, according to an example embodiment. The learning component 200 includes a variable extractor 210, a model trainer 220 and a classifier 230. The learning component 200 uses historical data as a raw data input 240. The historical data includes class labels. The process used by the learning component 200 includes taking raw data 240 and extracting variables (features) from the raw data 240 at the variable extractor 210. Pre-defined class labels are added to the extracted variables. A learning algorithm is used to detect patterns for classification. The detected patterns are used to build and train a model at the model trainer 220. The model is trained such that the various variables used will produce the proper classification at the classifier 230. In fraud detection, the transactions are initially classified or tagged as fraudulent or non-fraudulent. In this invention, the tag value for a transaction is initially set to a binary number and therefore the value is either "1" (fraudulent transaction) or "0" (non-fraudulent transaction). A fuzzy tag value is determined. The initial binary number tag value is then replaced with the fuzzy tag value. By replacing the initial binary number with a real value, in the range of 0 to 1, the fuzzy tag incorporates a degree of fraud or non-fraud. For example, a fuzzy tag value of 0.9 indicates that a particular transaction is more fraudulent than a transaction having a fuzzy tag value of 0.8.

When classifying new data instances, such as when a new transaction is occurring in real time or substantially real time, the classification criteria learned in the learning component 200 are used to make a prediction as to whether the transaction is fraudulent or non-fraudulent. Although this invention is described in the context of detecting fraud, it should be understood that the invention of a fuzzy tag value is not limited to modeling of transactions for fraud, but can be used for other applications as well. Some of the other applications include visualization, variable selection, segmentation, and scalability. Of course, there are other applications that are unnamed as well.

Figure 3:
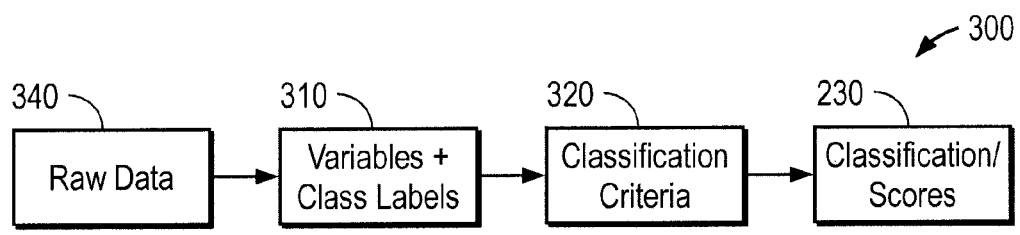
FIG. 3 is a schematic diagram of a predictive/scoring component of the fraud detection system, according to an example embodiment.

FIG. 3 is a schematic diagram of a predictive/scoring component 300 of the fraud detection system 100, according to an example embodiment. The predictive/scoring component 300 includes a source of raw data 340. The raw data 340 are transactions that are occurring in real time or substantially real time. In other words, the transactions are occurring or have occurred shortly beforehand. The predictive/scoring component 300 also includes a variable extractor 310. The variables that were determined to be relevant in the learning module 200 (see FIG. 2) are extracted from the raw data 340. The predictive/scoring component 300 also includes a classification applicator 320. The classification applicator 320 applies the classification criteria learned in the learning component 200 (see FIG. 2) to the variables. These classification criteria are then placed into a statistical model and scored. The output of the predictive/scoring component 300 is a classification (fraud or no-fraud) and a confidence measure. The score of the transaction is the confidence measure. The score can be restricted to a real number between 0 and 1 with the boundary values corresponding to pure no-fraud and fraud, respectively. As a result, the model score can be treated as a probability of a transaction being fraudulent. If a transaction is represented by a data point X, where X is of n-dimensions (a field in the transaction representing a dimension), then $$Score(X)=Pr(Fraud|X).$$

Figure 4:
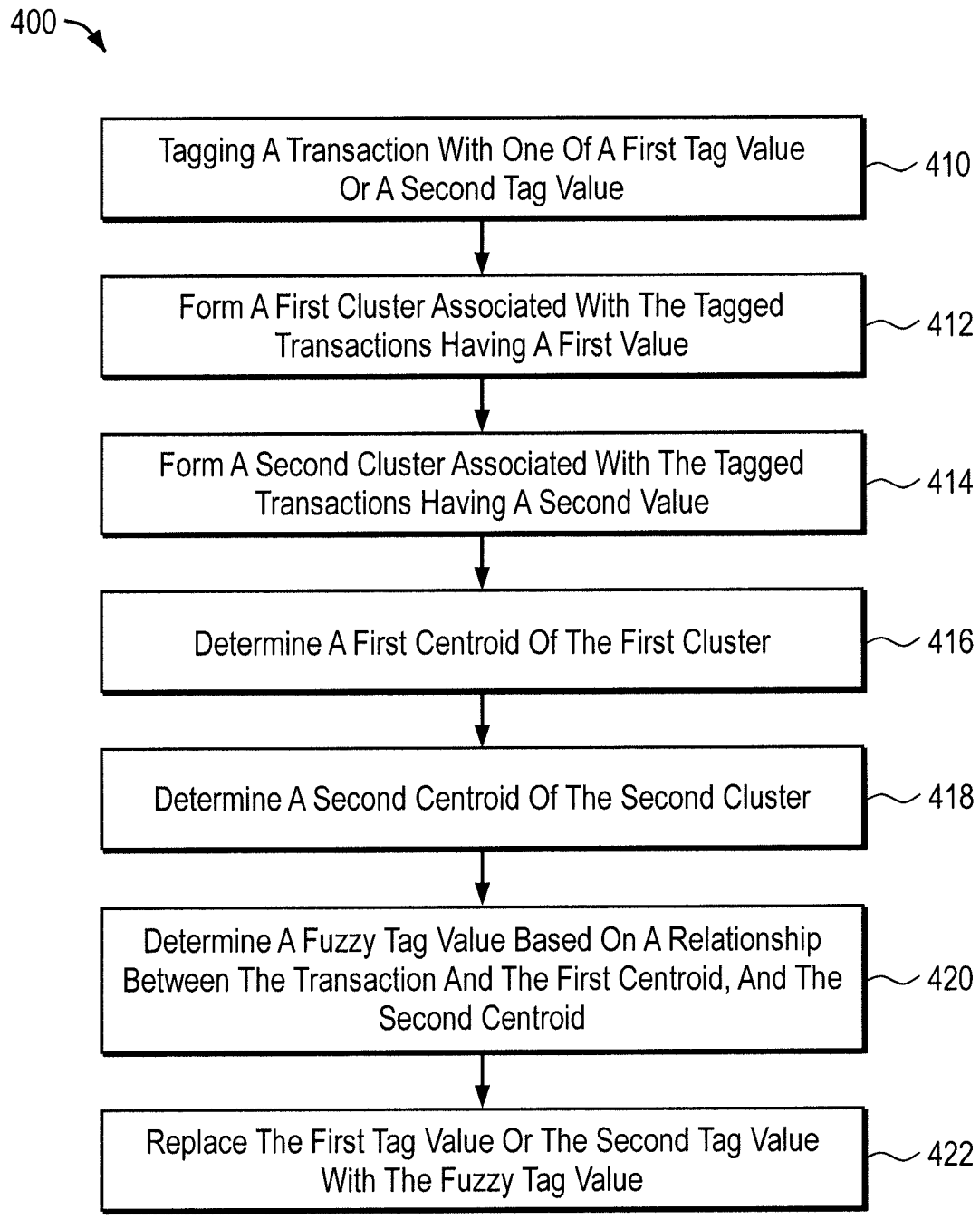
FIG. 4 illustrates a method for determining a fuzzy tag value with a single cluster of transactions having a first value and a single cluster of transactions having a second value, according to an example embodiment.

FIG. 4 illustrates a method 400 for determining a fuzzy tag value with a single cluster of transactions having a first value and a single cluster of transactions having a second value, according to an example embodiment. In the embodiment shown, the method 400 is a computer-implemented method. The method 400 includes tagging a transaction with one of a first tag value or a second tag value 410, forming a first cluster associated with the tagged transactions having a first value 412, and forming a second cluster associated with the tagged transactions having a second value 414. The computer implemented method 400 also includes determining a first centroid of the first cluster 416, and determining a second centroid of the second cluster 418. The method 400 also includes determining a fuzzy tag value based on a relationship between the transaction and the first centroid, and the second centroid 420. The method 400 also includes replacing the first tag value or the second tag value with the fuzzy tag value 422.

In one embodiment, determining the fuzzy tag value 420 includes determining a distance the transaction is from the first centroid, and a distance the transaction is from the second centroid. In some embodiments, the distance between the transaction and the first centroid includes determining the Euclidean distance between the transaction and the first centroid, and wherein determining the distance between the transaction and the second centroid includes determining the Euclidean distance between the transaction and the second centroid. Initially, the first value is set to 0 and corresponds to a non-fraud condition, and the second value is set to 1 and corresponds to a fraud condition. A formula can be used to determine the fuzzy tag values 420 associated with each transaction. The formula used is for computing a fuzzy membership matrix. In one specific embodiment, the fuzzy membership values include a determination of elements of a matrix U $$u_{ij} = \frac{1}{\sum_{k=1}^{C} \left( \frac{\|x_i - c_j\|}{\|x_i - c_k\|} \right)^{\frac{2}{m-1}}}$$

Where, m is any real number greater than 1.

$u_{ij}$ is the degree of membership of $x_i$ (transactions here) in the cluster j, $x_i$ is the $i^{th}$ transaction of d-dimensional measured record, $c_j$ is the d-dimension center of the cluster, and $\|*\|$ is any norm expressing the similarity between any measured transaction and the centroids.

Example 1

An example of the above method 400 will now be set forth. Table 1, and FIGS. 5 and 6 will be referred to in the explanation. The hard tagged fraud transactions is the Fraud cluster and the hard tagged non-fraud transactions is the Non-Fraud cluster, that is, no clustering algorithm is run. The tagged data defines the clusters. Consider six transactions with two variables, V1 and V2, that are hard tagged, that is, 0 means non-fraud, and 1 means fraud (Table 1).

TABLE 1

| V1 | V2 | Hard Tags |
|---|---|---|
| 1 | 1 | 0 |
| 3 | 2 | 0 |

TABLE 1-continued

| V1 | V2 | Hard Tags |
|---|---|---|
| 2 | 3 | 0 |
| 4 | 2 | 1 |
| 5 | 1 | 1 |
| 6 | 1 | 1 |

Figure 5:
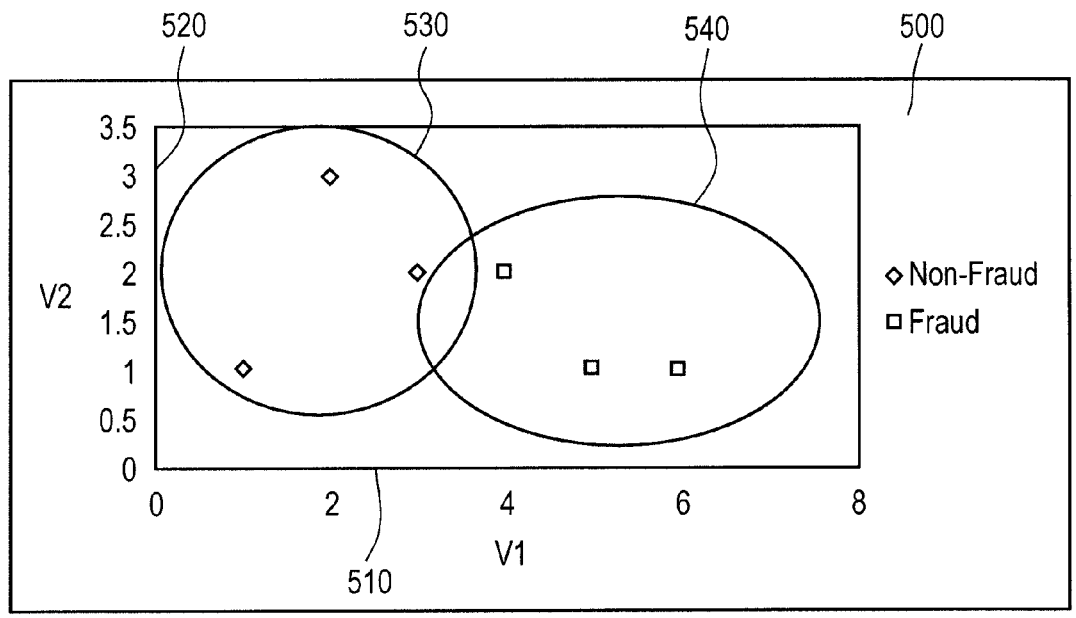
FIG. 5 is the graph illustrating the plotting of the fraud and non-fraud transactions of Table 1 of the example.

FIG. 5 is a graph illustrating the plotting of the fraud and non-fraud transactions in Table 1. FIG. 5 includes an x-axis 510 which carries the value for variable 1, also referred to V1, for the various transactions from Table 1. Also included is a y-axis 520 which carries the value for variable 2, also referred to V2, for the various transactions from Table 1. As shown in Table 1, the transactions have hard tags or initial binary values of "1" or "0". The transactions that share the "0" or indication of non-fraud are grouped or clustered into a cluster 530. The transactions that share the "1" or indication of fraud are grouped or clustered into a cluster 540. Therefore, the fraud tagged data forms the cluster 540, and the non-fraud tagged data is forms the cluster 530. The cluster centroids of the fraud cluster 540 and the non-fraud cluster 530 are computed. In this example, the centroid is computed by determining the arithmetic mean of the transactions in each cluster.

Non-Fraud cluster centroid: V1=2.00, V2=2.00

Fraud cluster centroid: V1=5.00, V2=1.33

Figure 6:
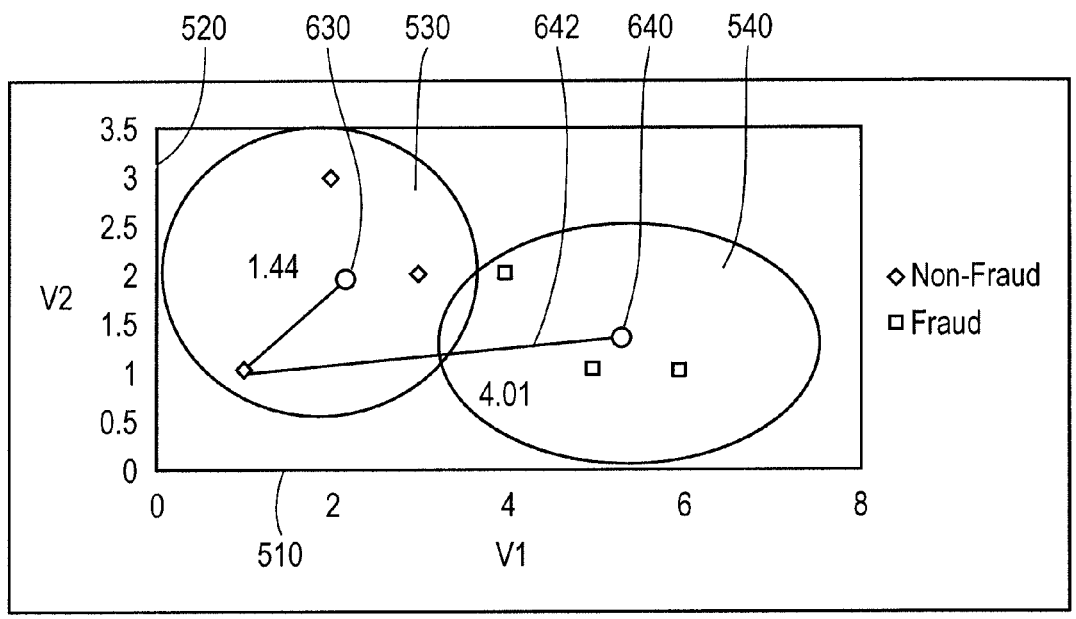
FIG. 6 is the graph illustrating the plotting of the fraud and non-fraud transactions in Table 1 of FIG. 5 which also includes the centroid of the non-fraud cluster, and includes the centroid of the fraud cluster.

FIG. 6 is the graph illustrating the plotting of the fraud and non-fraud transactions in Table 1 of FIG. 5 which also includes the centroid 630 of the non-fraud cluster 530 and which includes the centroid 640 of the fraud cluster 540. Once the cluster centroids 630, 640 are determined, the distance between the centroids 630, 640 and the transaction, such as transaction (1,1) are determined. Consider the first transaction (1, 1) from Table 1. A Euclidean distance 632 of the first transaction (1,1) from the centroid 630 and from the centroid 640 is determined. Now looking at FIG. 6, the Euclidean distance of the transaction (1,1) from the non-Fraud cluster centroid 630 is $$=\sqrt{(1-2)*(1-2)+(1-2)*(1-2)}=1.414$$

Similarly, the Euclidean distance 642 of the transaction (1,1) from the fraud cluster centroid 640 is $$\sqrt{(1-5)*(1-5)+(1-1.33)*(1-1.33)}=4.01$$

The fuzzy tag values associated with each transaction are computed using the formula for computing the U matrix (known as fuzzy membership matrix) in clustering algorithm set forth above. The Euclidean distances 632 (having a value of 1.414), and 642 (having a value of 4.010) are used to determine the fuzzy membership values. The fuzzy membership values computed for the transaction (1, 1) using the U matrix (Equation 1) formula is as follows:

Now $u_{ij}$ (i denotes the transaction and j the non-fraud cluster) of the transaction (1, 1) is $$=\frac{1}{\left(\frac{1.414}{1.414}\right)^2 + \left(\frac{1.414}{4.01}\right)^2} = 0.89 (approx)$$

Now $u_{ij}$ (i denote the point and j the fraud cluster) of the point (1, 1) is $$= \frac{1}{\left(\frac{4.01}{1.414}\right)^2 + \left(\frac{4.01}{4.01}\right)^2} = 0.11 (approx)$$

By property of (Equation [1]), the membership values of a transaction relative to Fraud and Non-Fraud clusters add up to 1. Table 2 shows the fuzzy membership values computed relative to the fraud cluster 540 and non-fraud cluster 530 over all the transactions.

TABLE 2

| Transactions | (1, 1) | (3, 2) | (2, 3) | (4, 2) | (5, 1) | (6, 1) |
| --- | --- | --- | --- | --- | --- | --- |
| Non-Fraud | 0.89 | 0.82 | 0.92 | 0.27 | 0.01 | 0.06 |
| Fraud | 0.11 | 0.18 | 0.08 | 0.73 | 0.99 | 0.94 |

Because by convention the values for tagging 1=Fraud and 0=Non-Fraud, the last row of Table 2 is taken as the fuzzy tag of the transactions, that is, higher the value more "fraud" it is. So, we compute the fuzzy membership values for the fraud cluster 540 only. As mentioned earlier, the membership values for the non-fraud cluster 530 (also depicted in row 1, Table 2) also gives the same information, as it is 1 minus membership value of the fraud cluster 540. Table 3 shows the fuzzy tag values associated with the 6 transactions of the example, which is simply the last row of Table 2.

TABLE 3

| V1 | V2 | Hard TAG | Fuzzy Tag |
| --- | --- | --- | --- |
| 1 | 1 | 0 | 0.11 |
| 3 | 2 | 0 | 0.18 |
| 2 | 3 | 0 | 0.08 |
| 4 | 2 | 1 | 0.73 |
| 5 | 1 | 1 | 0.99 |
| 6 | 1 | 1 | 0.94 |

Figure 7:
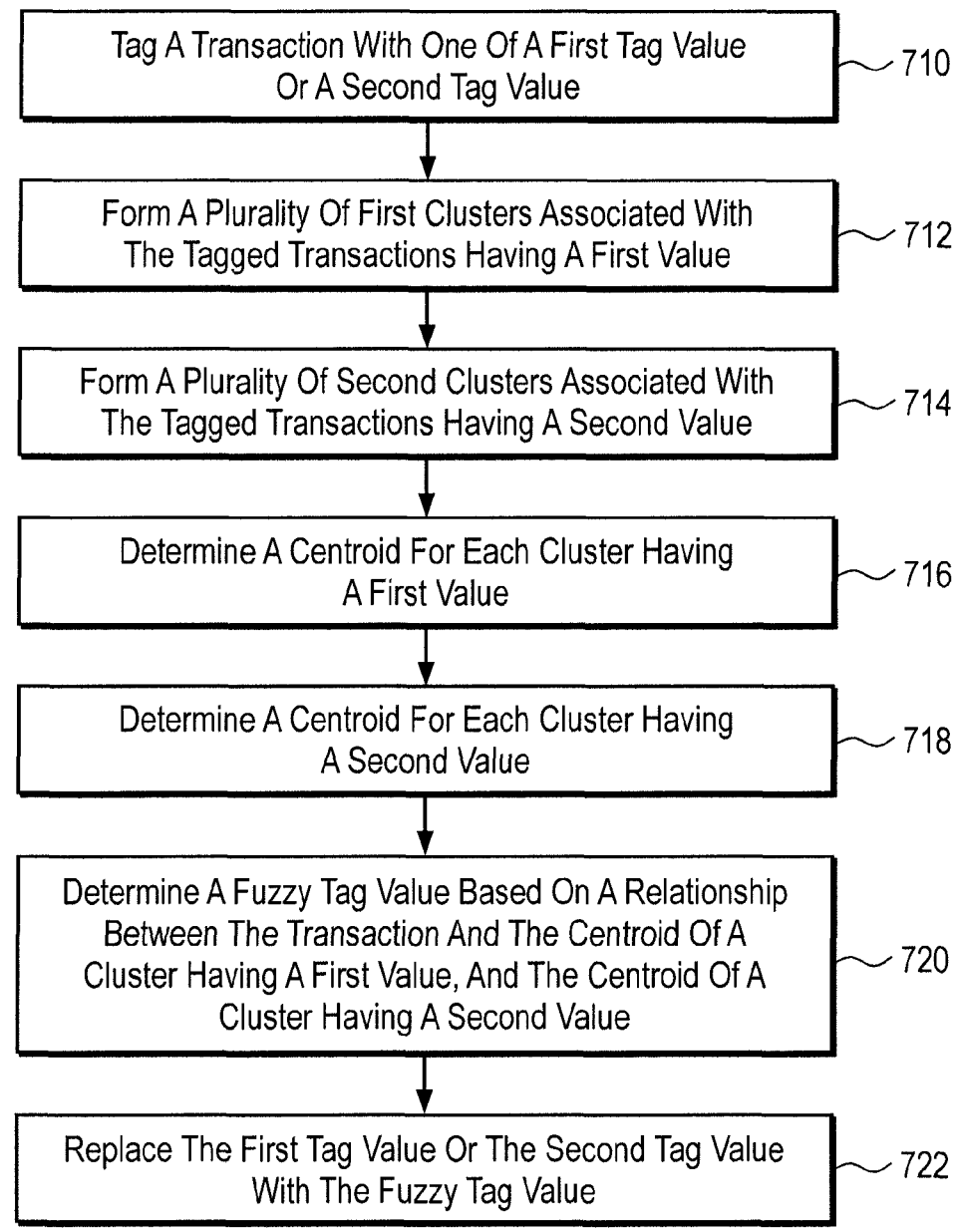
FIG. 7 illustrates a method for determining a fuzzy tag value with a plurality of clusters having transactions with a first value and a plurality of clusters having transactions with a second value, according to an example embodiment.

FIG. 7 illustrates a method 700 for determining a fuzzy tag value with a plurality of clusters having transactions with a first value, and a plurality of clusters having transactions with a second value, according to an example embodiment. The method 700 includes gathering data on various transactions and tagging the transactions with a hard or binary value having either a first value or a second value 710. A plurality of clusters from the tagged transactions having a first value are formed 712, and a plurality of clusters from the tagged transactions having a second value are formed 714. A centroid for each of the plurality of clusters of the tagged transactions having a first value is determined 716, and a centroid for each of the plurality of clusters of the tagged transactions having a second value is also determined 718. Each transaction is associated with one of the clusters having a first value and to one of the clusters having a second value 720. Different transactions may be associated with different clusters. In some instances, the Euclidean distance of the transaction from the two associated centroids is determined as in Example 1 above. In another embodiment, the relationship for determining the fuzzy tag value includes determining a weighted average of the distances from a transaction to the plurality of clusters from the tagged transactions having a first value, and determining a weighted average of the distances from a transaction to the plurality of clusters from the tagged transactions having a second value. Once the distances are computed, the fuzzy tag value is computed it is substituted in for the initial tag value. The fuzzy tag value is determined using the same computations as shown in Example 1 above. The fuzzy tag values are substituted for the initial binary tag values. It should be noted that any number of clusters can be formed. In other words, there may be a number of clusters associated with non-fraud transactions and another number of clusters associated with fraud clusters. These numbers do not have to match.

Example II

Figure 8:
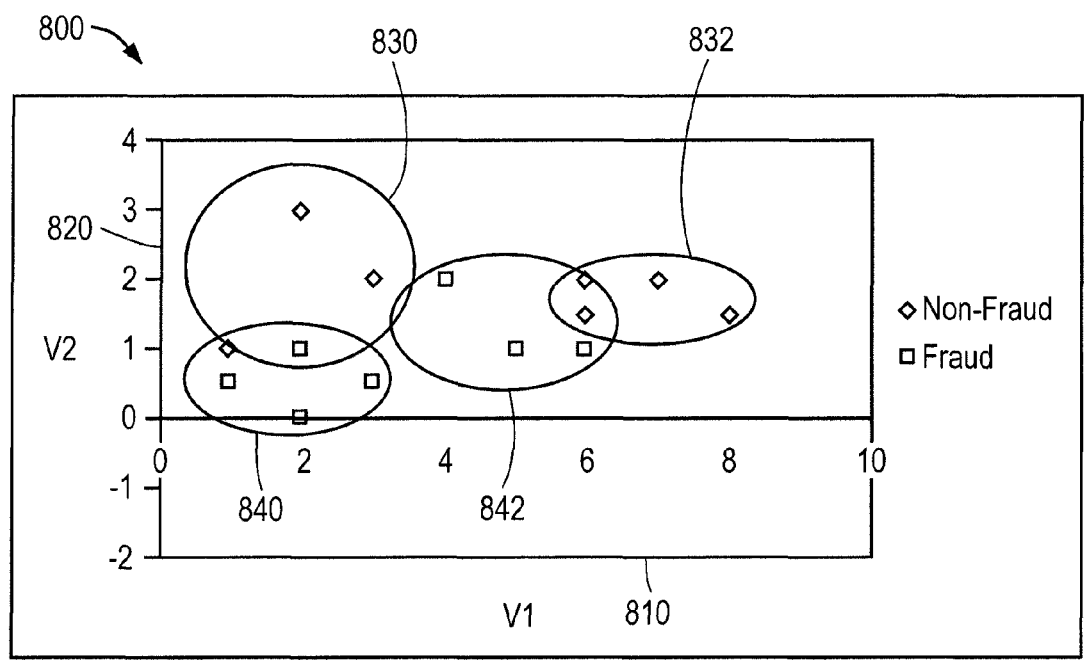
FIG. 8 shows the plotting of the transactions in Table 4 and the formation of a plurality of fraud clusters and a plurality of non-fraud clusters, according to the example embodiment.

Table 4 shows a data set of transactions which are represented by two variables, V1 and V2. FIG. 8 shows the plotting of the transactions in Table 4 and the formation of a plurality of fraud clusters and a plurality of non-fraud clusters, according to the example embodiment. In some instances, such as the data listed below, using a single cluster of non-fraud transactions and a single cluster of fraud transactions, has a lot of common area or is highly overlapped which indicates little differentiation. When two clusters are highly overlapped, in many cases the computed fuzzy tags are not consistent with the actual hard tags, because, sometimes lower values of fuzzy tags are obtained for fraud transaction and higher values obtained for non-fraud transactions due to the overlapping. Breaking a single non-fraud cluster into multiple non-fraud clusters and a single fraud cluster into multiple fraud clusters provides this differentiation and makes the tags more consistent with the actual hard tags.

TABLE 4

| V1 | V2 | Hard Tags |
| --- | --- | --- |
| 1 | 1 | 0 |
| 3 | 2 | 0 |
| 2 | 3 | 0 |
| 6 | 2 | 0 |
| 6 | 1.5 | 0 |
| 8 | 1.5 | 0 |
| 7 | 2 | 0 |
| 4 | 2 | 1 |
| 5 | 1 | 1 |
| 6 | 1 | 1 |
| 2 | 1 | 1 |
| 3 | 0.5 | 1 |
| 1 | 0.5 | 1 |
| 2 | 0 | 1 |

FIG. 8 includes an x-axis 810 for the variable V1 and a y-axis 820 for the variable V2. FIG. 8 also includes non-fraud clusters 830 and 832, and fraud clusters 840 and 842. It should be noted that the number of non-fraud clusters formed need not match the number of fraud clusters formed. The formation of clusters is based on the groupings of the data. For example, in some instances there could be five non-fraud clusters and two fraud clusters. There are mathematical formulae that can be used to cluster data such the classical K-means algorithm.

$$V = \sum_{i=1}^{k} \sum_{x_j \in S_i} (x_j - \mu_i)^2$$

Where there are k clusters $S_i$, i=1, 2, . . . , k, and $\mu_i$ is the centroid or mean point of all the points $x_j$ belong to cluster $S_i$. The algorithm begins with choosing k random centroids, associating $x_j$ to the clusters and recomputing $\mu_i$ and re-assigning the associated $x_j$ until the quantity V is minimized.

Once the clusters are found, the individual transactions are evaluated. For each transaction the nearest fraud cluster, and non-fraud cluster are determined. The distance to the centroid of the nearest fraud cluster, and to the centroid of the nearest non-fraud cluster are determined. The distance metric used in this example is Euclidean. Using the nearest fraud and non-fraud cluster centroids, fuzzy tag values are computed using the U matrix formula (as shown in Example I above) of the transaction. Table 5 shows the fuzzy tag value obtained for each transaction.

TABLE 5

| V1 | V2 | Hard Tag | Fuzzy Tag (using one cluster) | Fuzzy Tag (using multiple cluster) |
|----|----|----------|-------------------------------|-------------------------------------|
| 1  | 1  | 0 | 0.734778 | 0.615385 |
| 3  | 2  | 0 | 0.680751 | 0.235294 |
| 2  | 3  | 0 | 0.581395 | 0.137931 |
| 6  | 2  | 0 | 0.161736 | 0.301365 |
| 6  | 1.5 | 0 | 0.186233 | 0.377895 |
| 8  | 1.5 | 0 | 0.325479 | 0.152526 |
| 7  | 2  | 0 | 0.257773 | 0.027329 |
| 4  | 2  | 1 | 0.226087 | 0.734093 |
| 5  | 1  | 1 | 0.216216 | 0.970835 |
| 6  | 1  | 1 | 0.244259 | 0.503604 |
| 2  | 1  | 1 | 0.82881  | 0.800000 |
| 3  | 0.5 | 1 | 0.958078 | 0.764706 |
| 1  | 0.5 | 1 | 0.745017 | 0.764706 |
| 2  | 0  | 1 | 0.819165 | 0.941176 |

The mean fuzzy tag values of fraud and non-fraud transactions using multiple clusters are 0.782731 and 0.263961, respectively. The contrast between the fraud and non-fraud clusters is much better than using a one cluster analysis on the above data. That is, the mean fuzzy tag values of fraud and non-fraud transactions are closer to 1 and 0 respectively.

It should be noted that clustering large amount of data could be computationally expensive and the classical k-means or fuzzy c-means requires the full data to be loaded into memory. Fortunately, lots of scalable versions for clustering exist and a few of them can produce cluster by a single disk scan through the data on the disk, that is, the software can partition data sets larger than the size of the available memory. [See Prodip Hore, Lawrence Hall, and Dmitry Goldgof. Single Pass Fuzzy C Means. FUZZ-IEEE, 2007; and F. Famstrom, J. Lewis, and C. Elkan. Scalability of Clustering Algorithms Revisited. SIGKDD Explorations, pages 51-57, 2000.]

As mentioned previously, there are many areas of potential application of fuzzy tags. In addition to fraud detection and modeling, the fuzzy tags can be used for other modeling, visualization, variable selection, segmentation and the like. Fuzzy tags provide more meaningful information, so neural network, linear regression, and other supervised models can be built on fuzzy tags instead of hard tags. The additional information provided by fuzzy tags may improve the performance of models. Since fuzzy tags have continuous values, the target functions learned by models using fuzzy tags are expected to be smoother than models learned using hard tags. So, in the long term fuzzy models might generalize better on unseen data and may have less over fitting problems compared to models built using hard tags. It is contemplated that such models should be trained on fuzzy tags; however, the performance of the model should be evaluated using the hard tags. This is because hard tags values are representative of the event needed for feedback to the model.

Because fuzzy tags provide more meaningful information, neural network, linear regression, and other supervised models can be built with fuzzy tags instead of hard tags. The additional information provided by fuzzy tags may improve the performance of models. Since fuzzy tags have continuous values, the target functions learned by fuzzy models are expected to be smoother than learned using hard tags. So, in the long term fuzzy models might generalize better on unseen data and may have less over fitting problems compared to models built using hard tags. The model should be trained on fuzzy tags; however, the performance of the model should be evaluated using the hard tags (the usual way). This is because hard tags values are representative of the event needed for feedback to the model.

Visualization

Typically hundreds of variables are used to build analytic models. It is often difficult to visualize a variable space having large number of variables. As fuzzy tags are computed using the variables, visualization of fuzzy tags of the transactions gives the information about how well the variables separate fraud and non-fraudulent transactions. Moreover, the range of fuzzy tags is well defined, 0 to 1. In summary, the fuzzy tags help modelers understand the predictive power of the variables selected and may help predict or speculate about the performance of the model before it is actually built. The fuzzy tags could help in decisions regarding the need to select other variables or create new ones.

Variable Selection.

As mentioned above, plotting of fuzzy tags will tell us how well the variable space separates fraud and non-fraud transactions. This information can be quantified for each variable and used to make a variable selection algorithm (both linear and non-linear).

Each transaction produces a fuzzy tag value in the range of 0 to 1. A good variable should be able to separate between fraud and non-fraud transactions. So, the predictive power of a variable depends on how well it separates the classes. This information of separability can be measured using fuzzy tags. If two classes are well separated in a particular variable space, fuzzy tag computed will have less difference from its corresponding hard tags. This is because fraud and non-fraud transactions are likely to be closer to their corresponding fraud and non-fraud centroids respectively.

If fuzzy tags are generated by splitting transactions into multiple clusters (such as in Example II above), it will be able to select variables that have non-linear relationship with the target. This will be especially helpful for neural network modeling which is generally used for non-linear modeling. Set forth below is a method to quantify predictive power of the variables, which can be used for variable selection.

Variable Selection

As mentioned above, plotting of fuzzy tags yields information regarding how well the variable space separates fraud and non-fraud transactions. This information can be quantified for each variable and used to make a variable selection algorithm (both linear and non-linear). Each transaction produces a fuzzy tag value in the range of 0 to 1. A good variable should be able to separate between fraud and non-fraud transactions. So, the predictive power of a variable depends on how well it separates the classes. This information of separability can be measured using fuzzy tags. If two classes are well separated in a particular variable space, the computed fuzzy tag values will have less difference from its corresponding hard tag values. This is because fraud and non-fraud transactions are likely to be closer to their corresponding fraud and non-fraud centroids, respectively.

Figure 9:
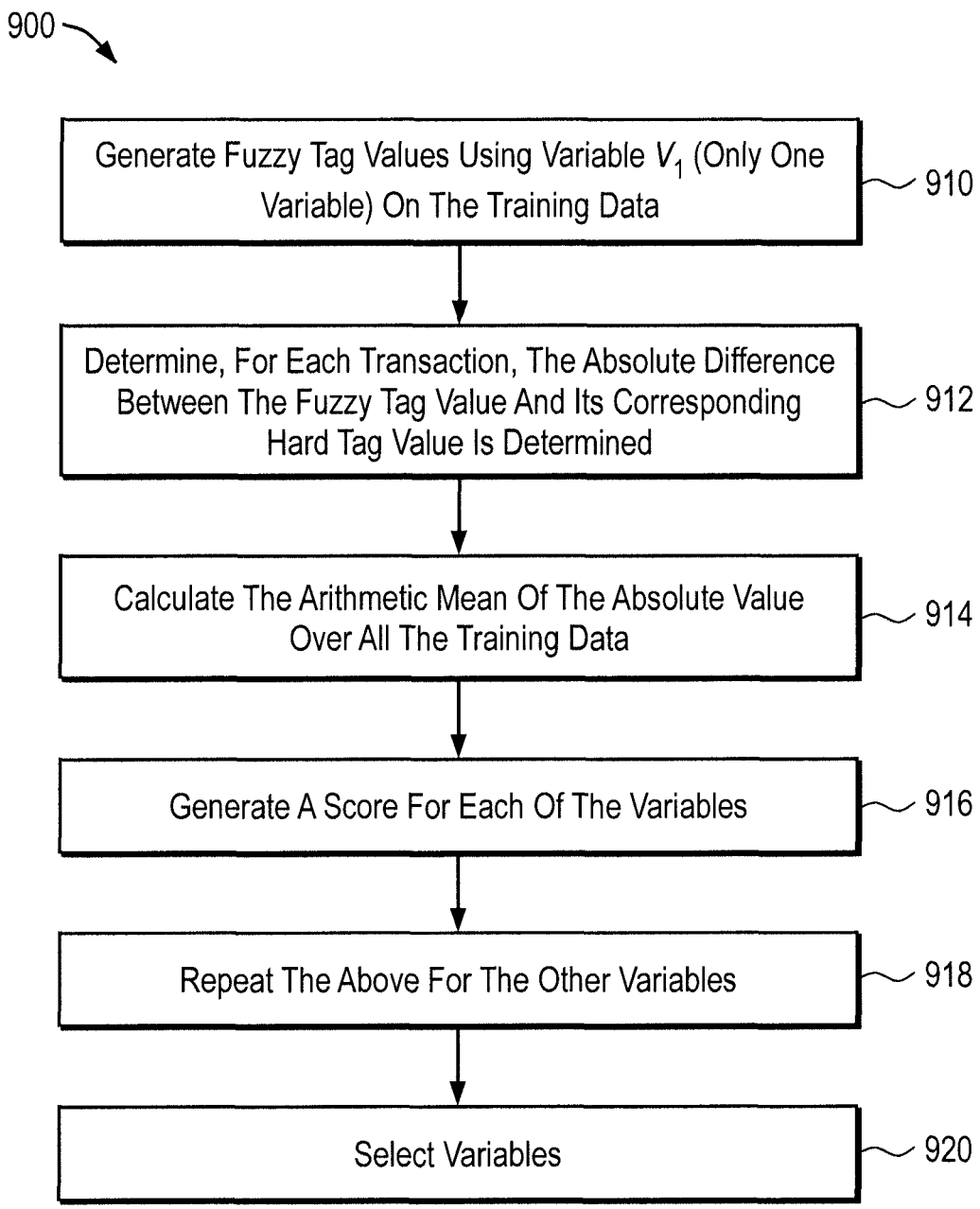
FIG. 9 is flow chart of a method for quantifying the predictive power of the variables, according to an example embodiment.

If the fuzzy tag values are generated by splitting transactions into multiple clusters, it will be able to select variables that have non-linear relationship with the target. This will be especially helpful for neural network modeling which is generally used for non-linear modeling. A method 900 for quantifying the predictive power of the variables, is set forth in FIG. 9. The method can be used for variable selection.

Assume there are m variables, $V_1$ to $V_m$. The method includes generating fuzzy tag values using variable $V_1$ (only one variable) on the training data 910. Assume there are $n_1$ fraud and $n_2$ non-fraud transactions in the training data. For each transaction, the absolute difference between the fuzzy tag value and its corresponding hard tag value is determined 912.

$$Diff_i = |Fuzzy_i - Hard_i|;$$

Where i=the $i^{th}$ transaction, $Fuzzy_i$=fuzzy tag of the $i^{th}$ transaction, $Hard_i$=Hard tag of the $i^{th}$ transaction.

1. The arithmetic mean of $Diff_i$ over all the training data is then computed 914. This score is indicative of the predictive power for the variable $V_i$. The fuzzy tag has a range of 0 to 1, the arithmetic mean of $Diff_i$ will also be in the range of 0 to 1. The closer the value of the arithmetic mean is to 0, more its predictive power. Therefore, the method 900 may also include a score 916 which is defined as follows:

$$Score\_i = \frac{1}{n}\sum_{i}^{n} Diff\_i$$

2. The above process is repeated for the other variables 918, and the scores are assorted in ascending order. The variables that are selected are the top ones.

The above method 900 computes predictive power for each variable independently (one at a time). However, one may use a combination of variables or use domain knowledge/simple rules to select the final list of variables. For example, if many variables of same type appear in the top list, one may select a few of them and ignore the other variables.

Figure 10:
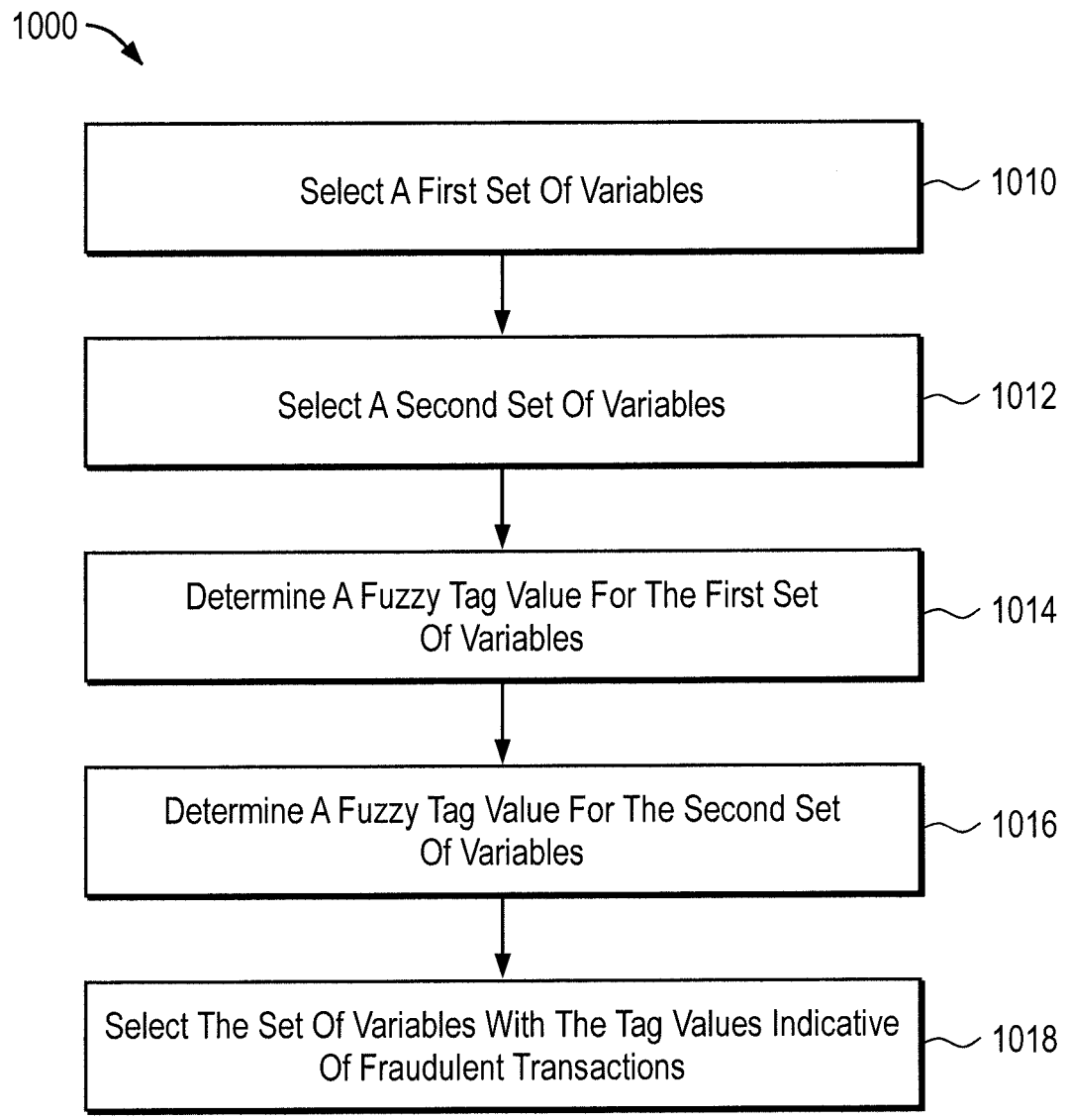
FIG. 10 is a flow chart of a method of selecting variables, according to an example embodiment, according to an example embodiment.

FIG. 10 is a method 1000 of selecting variables, according to an example embodiment. The method 1000 includes selecting a first set of variables 1010, and selecting a second set of variables 1012. The method 1000 also includes determining a fuzzy tag value for the first set of variables 1014, and determining a fuzzy tag value for the second set of variables 1016. The method also includes selecting the set of variables with the tag values that tend to indicate a fraudulent transaction 1018. As mentioned previously, the fuzzy tag values give an indication of the certainty with which one can predict an event. It should be noted that this invention covers selecting any number of variables for evaluation and comparison to one another.

Segmentation

Transactions can be segmented based on fuzzy tags computed using variables of interest (the variables which would decide segmentation/partition) and models can be built on those segments. Business rules may also be created by analyzing particular transactions of interest, including, transactions having very low and very high fuzzy tag values. For example, as very high fuzzy tag valued transactions are likely to be at the epicenter of fraud activities, these particular transactions can be mined using an Apriori algorithm to create association rules. The Apriori algorithm is generally used for basket data mining, where rules are created by discovering hidden association among patterns in a data set. These rules could then be used for cross selling products, increasing profitability, customer retention etc. in industry.

Scalability

Fuzzy tags can be used to segment "important transactions", so that quality of a model built on this subset of transactions is comparable to model built using all the transactions. This will reduce training time while building neural network models, which are considered to be computationally expensive. One way to segment "important transactions" could be to select transactions at the border of classes (say fuzzy tag values greater than 0.3 and less than 0.7).

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, an instruction set, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Figure 11:
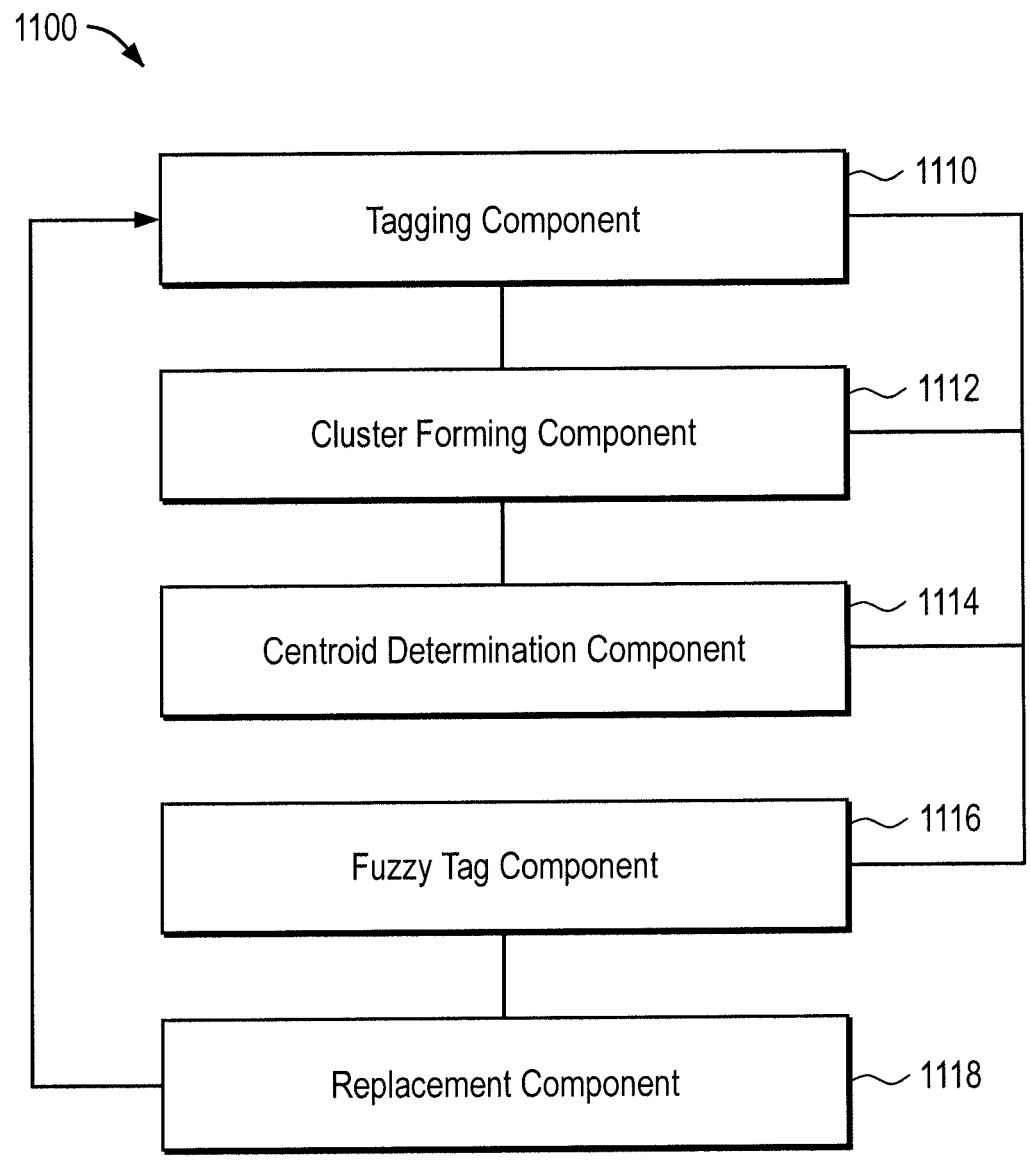
FIG. 11 is an apparatus for selecting a set of variables.

An apparatus can include hardware, software or both. FIG. 11 shows an apparatus 1100 for selecting a set of variables that includes a tagging component for tagging a transaction with one of a first tag value or a second tag value 1110, and a cluster forming component 1112 for forming a first cluster associated with the tagged transactions having a first value, and forming a second cluster associated with the tagged transactions having a second value. The apparatus 1100 also includes a centroid determination component 1114 for determining a first centroid of the first cluster and a second centroid of a second cluster, and a fuzzy tag component 1116 for determining a fuzzy tag value based on a distance the transaction is from the first centroid, and a distance the transaction is form the second centroid. The apparatus 1100 also includes a replacement component 1118 for replacing the first tag value or the second tag value with the determined fuzzy tag value. The apparatus may also include an evaluation component 1120 for ranking a set of variables associated with the transaction based on the fuzzy tag value associated with a plurality of clusters. Each of the components in the apparatus, may include of a combination of hardware and software. In some embodiments, each of the components includes software.

The invention may also include a machine-readable medium that provides instructions that, when executed by a machine, cause the machine to: tag a transaction with one of a first tag value or a second tag value, form a first cluster associated with the tagged transactions having a first value, and form a second cluster associated with the tagged transactions having a second value. The first centroid of the first cluster is determined. The second centroid of the second cluster is also determined. A fuzzy tag value is based on a relationship between the transaction and the first centroid, and the second centroid. The initial values of the first tag or the second tag are replaced with the fuzzy tag value. The first value is 0 which corresponds to a non-fraud condition, and the second value is 1 which corresponds to a fraud condition. In some embodiments, the relationship for determining the fuzzy tag value includes a distance the transaction is from the first centroid, and a distance the transaction is from the second centroid. The fuzzy tag values associated with each transaction are computed using the formula for computing a fuzzy membership matrix. In one embodiment, the machine-readable medium provides instructions that, when executed by a machine, further cause the machine to: form a plurality of clusters from the tagged transactions having a first value; and form a plurality of clusters from the tagged transactions having a second value. It should also be noted that there may be more than a first cluster and a second cluster that are formed from the various transactions. In some embodiments, there may be a plurality of clusters having a first value and a plurality of clusters having a second value.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A method for implementation by one or more data processors comprising:

tagging, by at least one data processor, each of a plurality of transactions, based on parameters associated with the transactions, with one of a first tag value, representing a non-fraud condition, or a second tag value, representing a fraud condition;

forming, by at least one data processor, a first cluster associated with the tagged transactions having the first tag value;

forming, by at least one data processor, a second cluster associated with the tagged transactions having the second tag value;

determining, by at least one data processor, a first centroid of the first cluster;

determining, by at least one data processor, a second centroid of the second cluster;

determining, by at least one data processor, a fuzzy tag value for one transaction of the plurality of transactions, based on a relationship between the transaction and the first centroid, and between the transaction and the second centroid, wherein the relationship for determining the fuzzy tag value includes a distance the transaction is from the first centroid, and a distance the transaction is from the second centroid; and replacing, by at least one data processor, in the one transaction of the plurality of transactions, the first tag value or the second tag value with the fuzzy tag value.

2. The method of claim 1 wherein determining the distance between the transaction and the first centroid includes determining the Euclidean distance between the transaction and the first centroid, and wherein determining the distance between the transaction and the second centroid includes determining the Euclidean distance between the transaction and the second centroid.

3. The method of claim 1 wherein the first tag value is 0 which corresponds to a non-fraud condition, and the second tag value is 1 which corresponds to a fraud condition.

4. The method of claim 1 wherein determining the fuzzy tag values associated with each transaction are computed using the formula for computing a fuzzy membership matrix.

5. The method of claim 4 wherein determining the fuzzy membership values includes a determination of elements of a matrix U $$u_{ij} = \frac{1}{\sum_{k=1}^{C}\left(\frac{\|x_i - c_j\|}{\|x_i - c_k\|}\right)^{\frac{2}{m-1}}}$$

Where,
m is any real number greater than 1,
$u_{ij}$ is the degree of membership of $x_i$ (transactions here) in the cluster j,
$x_i$ is the transaction of d-dimensional measured record,
$c_j$ is the d-dimension center of the cluster, and $\|*\|$ is any norm expressing the similarity between any measured transaction and the centroids.

6. The method of claim 1 further comprising:

forming, by at least one data processor, a plurality of clusters from the tagged transactions having a first tag value; and forming, by at least one data processor, a plurality of clusters from the tagged transactions having a second tag value.

7. The method of claim 6 further comprising:

determining, by at least one data processor, a centroid for each of the plurality of clusters from the tagged transactions having a first tag value; and determining, by at least one data processor, a centroid for each of the plurality of clusters from the tagged transactions having a second tag value.

8. The method of claim 7 further comprising associating, by at least one data processor, a transaction to one of the clusters having a first tag value and to one of the clusters having a second tag value.

9. The method of claim 8 wherein different transactions may be associated with different clusters.

10. The method of claim 9 wherein a fuzzy tag value is based on a relationship between the transaction and the associated clusters.

11. The method of claim 1 further comprising ranking, by at least one data processor, a set of variables associated with the transactions based on the fuzzy tag value.

12. The method of claim 1 further comprising segmenting, by at least one data processor, a set of variables associated with the transactions based on the fuzzy tag value; and discovering, by at least one data processor, hidden associations among patterns in a data set comprising the transactions, the hidden associations being used to create association rules.

13. The method of claim 1 wherein the relationship for determining the fuzzy tag value includes a weighted average of the distances from a transaction to the plurality of clusters from the tagged transactions having a first tag value, and a weighted average of the distances from a transaction to the plurality of clusters from the tagged transactions having a second tag value.

14. An apparatus comprising:
one or more programmable data processors;
memory;
a tagging component for tagging each of a plurality of transactions, based on parameters associated with the transactions, with one of a first tag value, representing a non-fraud condition, or a second tag value, representing a fraud condition, based on parameters associated with the transactions;
a cluster forming component for forming a first cluster associated with the tagged transactions having the first tag value, and for forming a second cluster associated with the tagged transactions having the second tag value;
a centroid determination component for determining a first centroid of the first cluster and a second centroid of the second cluster; and
a fuzzy tag component for determining a fuzzy tag value for one transaction of the plurality of transactions, based on a distance the one transaction is from the first centroid, and a distance the one transaction is from the second centroid, and
a replacement component for replacing, in the one transaction of the plurality of transactions, the first tag value or the second tag value with the fuzzy tag value.

15. The apparatus of claim 14, further comprising an evaluation component for ranking a set of variables associated with the transaction based on the fuzzy tag value associated with a plurality of clusters.

16. The apparatus of claim 14 wherein at least one of the components is comprised of a combination of hardware and software.

17. The apparatus of claim 14 wherein each of the components is comprised of software.

18. A non-transitory machine-readable medium that provides instructions that, when executed by a machine, cause the machine to:

tag each of a plurality of transactions, based on parameters associated with the transactions, with one of a first tag value, representing a non-fraud condition, or a second tag value, representing a fraud condition;

form a first cluster associated with the tagged transactions having the first tag value;

form a second cluster associated with the tagged transactions having the second tag value;

determine a first centroid of the first cluster;

determine a second centroid of the second cluster;

determine a fuzzy tag value for one transaction of the plurality of transactions, based on a relationship between the transaction and the first centroid, and between the transaction and the second centroid, wherein the relationship for determining the fuzzy tag value includes a distance the transaction is from the first centroid, and a distance the transaction is from the second centroid; and replace in the one transaction of the plurality of transactions, the first tag value or the second tag value with the fuzzy tag value.

19. The non-transitory machine-readable medium of claim 18 wherein the first tag value is 0 which corresponds to a non-fraud condition, and the second tag value is 1 which corresponds to a fraud condition.

20. The non-transitory machine-readable medium of claim 18 wherein determining the fuzzy tag values associated with each transaction are computed using the formula for computing a fuzzy membership matrix.

21. The non-transitory machine-readable medium of claim 18 that provides instructions that, when executed by a machine, further cause the machine to:

form a plurality of clusters from the tagged transactions having a first tag value; and form a plurality of clusters from the tagged transactions having a second tag value.

22. The non-transitory machine-readable medium of claim 21 wherein a fuzzy tag value is based on a relationship between the transaction and the associated clusters.

* * * * *

UNITED STATES PATENT AND TRADEMARK OFFICE
CERTIFICATE OF CORRECTION

| | |
|---|---|
| PATENT NO. | : 8,805,836 B2 |
| APPLICATION NO. | : 12/201795 |
| DATED | : August 12, 2014 |
| INVENTOR(S) | : Hore et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1246 days.

Signed and Sealed this
Thirteenth Day of October, 2015

Michelle K. Lee
*Director of the United States Patent and Trademark Office*